Feb. 3, 1942. J. T. EDWARDS ET AL Re. 22,016

ELECTRIC STEAM IRON

Original Filed July 28, 1937 2 Sheets-Sheet 1

INVENTORS
J. T. EDWARDS
C. EDWARDS
BY
E. A. Huffman
ATTORNEY.

Feb. 3, 1942. J. T. EDWARDS ET AL Re. 22,016

ELECTRIC STEAM IRON

Original Filed July 28, 1937 2 Sheets-Sheet 2

INVENTORS
J. T. EDWARDS
C. EDWARDS
E. E. Hubman
ATTORNEY.

Reissued Feb. 3, 1942

Re. 22,016

UNITED STATES PATENT OFFICE 22,016

ELECTRIC STEAM IRON

Judson T. Edwards and Crewdson Edwards, St. Louis, Mo., assignors, by mesne assignments, to The Silex Company, Hartford, Conn.

Original No. 2,199,911, dated May 7, 1940, Serial No. 156,087, July 28, 1937. Application for reissue January 28, 1941, Serial No. 377,526

13 Claims. (Cl. 38—77)

Our invention relates to pressing irons and more particularly to the type known as the electric steam iron in which the steam is generated by an electrical unit that heats the pressing surface of the iron.

An object of our invention is to provide a steaming iron having means in the ironing surface thereof, such as grooves or the like, for applying steam to the surface of the material being ironed in such a manner that the said steam will enter the grooves in the direction of the grooves, and will be spread out over said surface of the material and not applied in spots such as has been heretofore commonly done.

One of the objects of our invention is to construct a self-contained electric steam iron which will generate the proper amount of steam for pressing and which will discharge the steam free of water to the fabric being pressed in such a way that the heated base of the iron will properly and efficiently press the fabric.

Another object of our invention is to construct an electric steam iron in which the upper part of the water reservoir is made as an integral unit and the bottom thereof is made from the same material and so associated and welded thereto that the reservoir will not leak and thereby impair its usefulness as a result of changes in temperature to which the iron is subjected during its life.

Still another object of our invention is to produce an iron of the type referred to which will be simple in construction, easy to assemble, efficient in operation, and economical to manufacture.

These and other objects of our invention will become apparent from the following description taken in connection with the accompanying drawings showing a preferred embodiment, in which Figure 1 is a longitudinal cross-sectional view of an iron embodying our invention;

Figure 1:
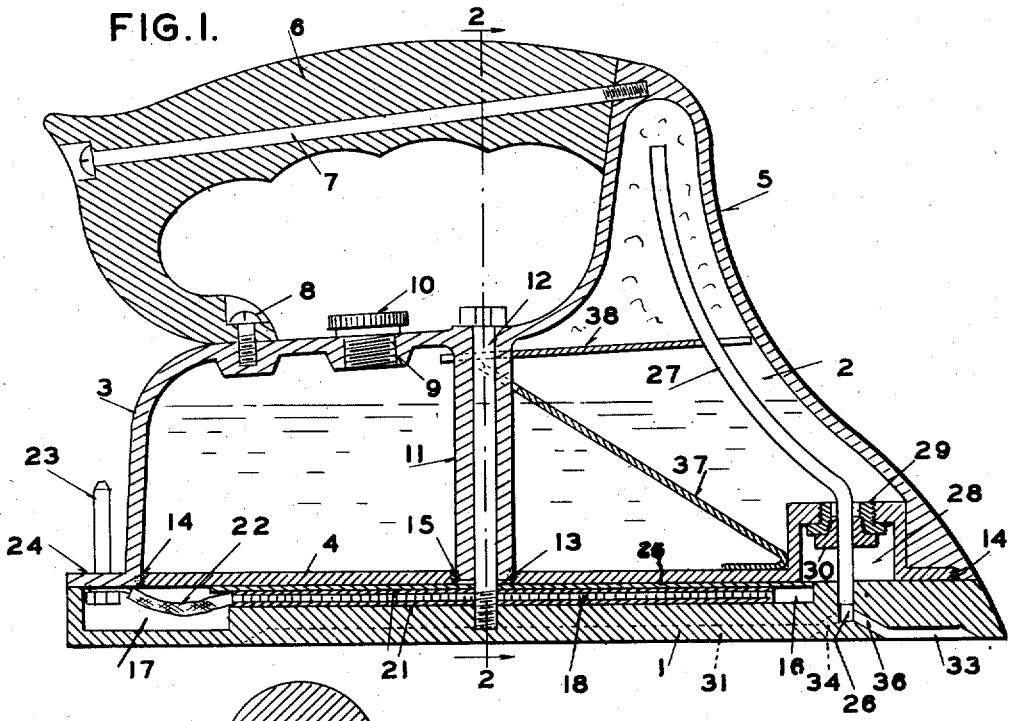
Figure 2:
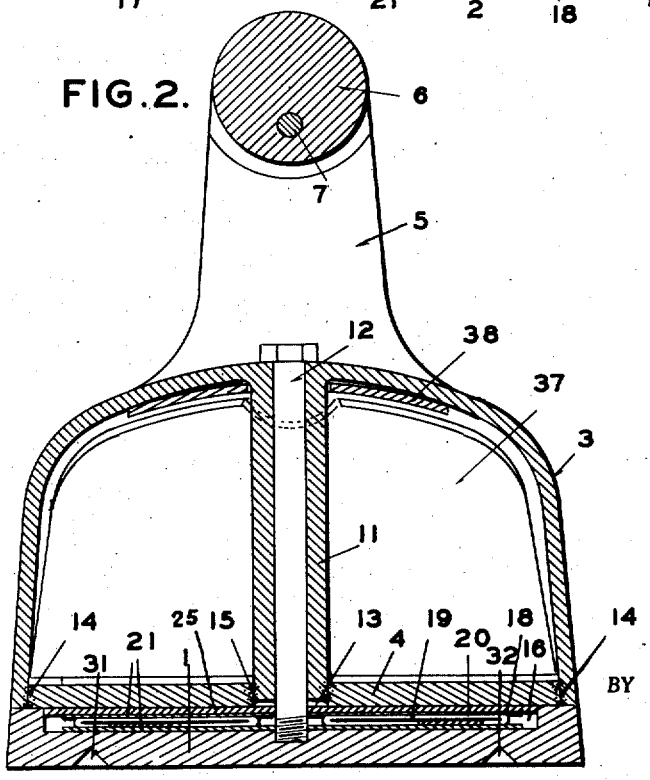
Figure 2 is a cross-sectional view taken on the line 2—2 of Figure 1.

Referring to the drawings in detail, the numeral 1 indicates a base member or sole plate, and 2 the reservoir which is positioned above the base member. The reservoir is formed in two pieces, preferably cast and of an alloy of aluminum, the upper part 3 being one integral hollow piece and the bottom plate 4 being of a shape to fit within the lower edges of the upper part. The upper hollow part is formed with a hollow dome portion 5 at its forward end, said dome portion being adapted to receive the steam generated in the reservoir during the operation of the iron. The handle 6 of the iron has its forward end secured to the dome portion by a bolt 7 and its lower rear end secured to the top rear end of the upper part 3 of the reservoir by a bolt 8. The handle may be made of any suitable insulating material, such as wood or a molded phenolic condensation product. The top of the upper part 3 of the reservoir is also provided with a filler opening 9 which is closed by a plug 10, thus permitting the reservoir to be readily filled. The upper part also has cast integral with its top wall a downwardly extending post 11 which is bored out for receiving a bolt 12 whereby the base member 1 may be clamped to the bottom of the reservoir.

The manner in which the reservoir is formed from two pieces of like material is a very important feature of our invention since it results in an electric steam pressing iron which will be absolutely leak-proof during the entire life of the iron and which also facilitates the assembly of the parts which go into the reservoir and lends itself to the construction of the iron as a whole at a very low cost. As already pointed out, the bottom plate 4 is of such shape as to snugly fit with the lower edges of the upper part 3. The plate is also formed with a hole 13 for receiving the lower end of the post 11 which is of such length as to extend substantially through the hole when the plate is in its proper position. The plate is welded to the upper part along the entire marginal seam, as indicated at 14, thus permanently securing the two parts together and forming a joint which will not be affected by any contraction or expansion of the metal due to changes in temperature. Also, since the upper part of the reservoir and the plate are of the same material, the expansion or contraction of the metal will not place any strain on the joint which would tend to cause it to leak. The seam between the hole 13 and the lower end of the post 11 is also welded as shown at 15.

Figure 3:
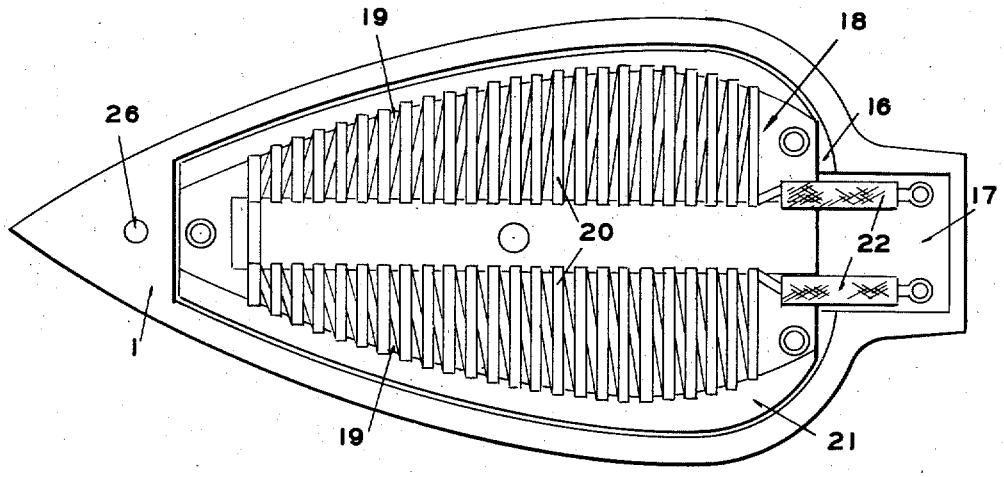
Figure 3 is a top view of the base portion showing the heating element in position.

The central top portion of the base member 1 is formed with a shallow recess 16 and the rear portion thereof is formed with a deeper recess 17. An electrical heating element 18 (Figure 3) is positioned in the shallow recess 16, this heating element being of well known construction and comprising two core pieces 19 wrapped with resistance wire 20 and interposed between two sheets of mica 21. The wire is connected to two insulated straps 22 which extend into the rear recess 17 where they are attached to the bottom of contact posts 23 mounted in a flange 24 on the rear of the upper part 3 of the reservoir. The contact posts are adapted to project into a well known plug (not shown) which is carried on the end of an extension cord connected to the electrical outlet box. A thin sheet of steel or other suitable material 25 approximately one-sixteenth of an inch in thickness is interposed between the heating element and the bottom plate 4 and acts as an insulator to prevent an excessive amount of heat from being transmitted to the water in the reservoir and to also confine the major portion of the heat in the base member.

The front end of the base member is provided with a vertical bore or chamber 26 into which is snugly fitted the lower end of a steam tube 27. This tube extends through the bottom plate 4 into the reservoir and to a point adjacent the top of the dome portion 5. The bottom plate at the point where the tube passes therethrough, is formed with a recess 28 in order to provide space for a joint which comprises an enlarged annular nut 29 screwed into the plate and a second annular nut 30 screwed into the nut 29 and engaging the tube. The cooperating threads of the two nuts are tapered in order to insure that the tube will be tightly engaged by the nut 30 when screwed home and thus prevent any leakage.

Figure 4:
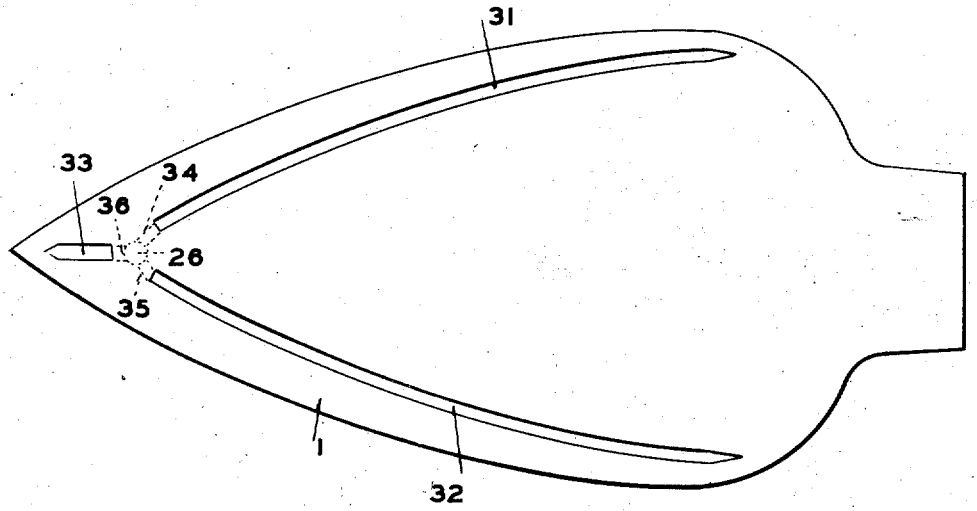
Figure 4 is a bottom view of the base showing the steam conducting grooves therein.

The bottom or ironing surface of the base member is provided with two open grooves 31 and 32 (Figure 4) which may extend from a point adjacent the bore or chamber 26 rearwardly at a spaced distance from the marginal edge of the base member. The bottom surface may also be provided with a short open groove 33 which extends from a point adjacent the bore or chamber 26 forwardly to a point adjacent the front end of the base member. The ends of the grooves 31 and 32 are connected by conduits such as 34 and 35, respectively to the bore 26 and the end of groove 33 is connected to the bore by a similar conduit 36. All of these conduits are only at a slight angle to the bottom surface of the base and because of this the steam from the steam tube will flow into the grooves in substantially the longitudinal direction of the grooves, and in a direction substantially parallel to the surface of the material being ironed. This is another important feature of our invention as it enables the steam to be properly applied to the material during pressing. The open grooves permit the steam to be applied generally and not in spots as is the case in prior devices which employ channels and spaced outlet ports from the channels. Also, by using open grooves the steam, when applied to the material, will be of the proper dampness, it not having been dried out by the passage through any ports leading from the grooves. The use of the forwardly extending groove 33 insures that steam will be applied to the tip of the base portion as the iron moves forwardly, thus properly dampening the material for ironing. The rearwardly extending open grooves 31 and 32 insure that steam will be applied to a greater amount to the material under the front end of the base portion but will decrease gradually toward the rear end of the base portion, thus permitting the fabric to be properly "dried" by the iron as it moves over the material.

In order to prevent the water in the reservoir from splashing about as the iron is moved, we also provide a baffle plate 37 preferably formed separate from the upper part 2 of the reservoir. The baffle plate inclines rearwardly and its upper end is notched to surround the upper end of post 11. The lower end is bent backwardly to form a yieldable end engageable with the bottom plate, whereby the baffle plate will be yieldably held in position when the bottom plate 4 is welded in position. If required, a second baffle plate 38 may be employed in the position shown, and held in this position by the upper end of the baffle plate 37. The baffle plate 38 is suitably notched to fit around the post 11 and the steam tube 27. Both baffle plates are so formed that there is sufficient space between them and the adjacent walls of the upper part 3 to permit passage of steam.

From the foregoing it is clearly apparent that the iron is quickly assembled by a minimum number of operations. The baffle plates 37 and 38 (or just the baffle plate 37 if only one is employed) are placed in the upper part 3 and then the bottom plate 4 set within the lower edges of the upper part and welded along the entire seam and around the end of post 11. Next, the steam tube is inserted and the nuts 29 and 30 screwed up tightly. The heating element 18 and insulating plate 25 are then properly mounted on the base member, the straps 22 connected to the contact posts, and the base secured to the reservoir by bolt 12. The construction permits easy removal of the base to replace the heating element in the event it should become inoperative.

When water is placed in the reservoir and the heating element connected to a source of electricity, steam will be generated and the base member will become heated. The amount of steam generated will be just sufficient to properly dampen the fabric for efficient pressing by the base portion which does not reach such a high temperature that the fabric will be scorched. The novel means for applying steam to the fabric insures that it will be applied in the proper amount and at the proper places. By having the steam dome well above the water, there are no drops of water conveyed to the fabric.

Being aware of the possibility of modifications in the particular structure herein described without departing from the fundamental principles of our invention, we do not intend that its scope be limited except as set forth in the appended claims.

We claim:

1. In a pressing iron of the class described, a base member for performing the pressing operation, a liquid-containing reservoir associated with the base member, means for applying heat to the base member and for generating steam from the liquid in the reservoir, the bottom surface of said base member being provided with two grooves having downwardly diverging walls and being open throughout their entire length to the material being pressed and extending rearwardly from the forward end of the base member and adjacent the marginal edges of the base, and means for conducting steam from the reservoir to the forward ends of the grooves, said means comprising conduit means joining the ends of the grooves and so associated with the grooves that said conduit means will guide the steam into said grooves in a direction substantially the same as that in which the grooves extend to thus distribute said steam onto the top surface of the material being pressed.

2. In a pressing iron of the class described, a base member for performing the pressing operation, a liquid-containing reservoir associated with the base member, means for applying heat to the base member and for generating steam from the liquid in the reservoir, the bottom surface of said base member being provided with an open groove, the open side of which is of a width not less than the width of any other portion of the groove, said groove extending rearwardly from the forward end of the base member, and means for conducting steam from the reservoir to the forward end of said groove, said means comprising a conduit joining the end of the groove and so associated with the groove that it will guide the steam into said groove in a direction substantially the same as that in which the groove extends to thus distribute said steam onto the top surface of the material being pressed.

3. In a pressing iron of the class described, a base member for performing the pressing operation, a liquid-containing reservoir associated with the base member, means for applying heat to the base member and for generating steam from the liquid in the reservoir, the bottom surface of said base member being provided with two open grooves extending rearwardly from the forward end of the base member and adjacent the marginal edges of the base, said bottom surface also being provided with an open groove extending forwardly from a point adjacent the forward ends of the first named grooves, the open side of each of said grooves being of a width not less than the width of any other portion of the groove, and means for conducting steam from the reservoir to the forward ends of the first named grooves and the rear end of the second named groove, said means comprising conduits so associated with the respective grooves that they will guide the steam into said grooves in a direction substantially the same as that in which the grooves extend to thus distribute said steam onto the top surface of the material being pressed.

4. In a pressing iron of the class described, a base member for performing the pressing operation, a liquid-containing reservoir associated with the base member, means for applying heat to the base member and for generating steam from the liquid in the reservoir, the bottom surface of said base member being provided with an open groove extending rearwardly from the forward end of the base member, said bottom surface also being provided with an open groove extending forwardly from a point adjacent the forward end of the first named groove, the open end of each of said grooves being of a width not less than the width of any other portion of the groove, and means for conducting steam from the reservoir to the forward end of the first named groove and the rear end of the second named groove, said means comprising conduits so associated with the respective grooves that they will guide the steam into said grooves in a direction substantially the same as that in which the grooves extend.

5. In a pressing iron of the class described, a single piece base member having a shallow recess in its top, a reservoir positioned above said base member and detachably secured thereto, said reservoir comprising a hollow upper part provided with an upwardly extending hollow dome portion and a separate bottom plate of like material permanently secured to the base portion of the upper part along the entire marginal seam, a flat electrical heating element positioned between the base member and the bottom plate of the reservoir and lying in the recess of the latter, means for conducting steam from the top part of the dome portion of the reservoir to the bottom surface of the base member and comprising a tube passing through the bottom plate of the reservoir and extending through the reservoir and into the dome portion from the bottom thereof, means for removably securing the tube to the bottom plate of the reservoir and arranged and disposed so that the tube may be removed through the bottom plate, and conduit means in the base member and telescopically receiving the lower end of the tube.

6. In a pressing iron of the class described, a base member, a reservoir positioned above said base member and detachably secured thereto, said reservoir comprising an integral hollow upper part provided with an upwardly extending hollow dome portion at its forward end and a separate bottom plate of like material permanently secured to the base portion of the upper part along the entire marginal seam, the forward wall of the reservoir and the forward wall of the dome portion being one smooth continuous wall extending upwardly and rearwardly, a heating element positioned between the base member and the bottom plate of the reservoir, said base member being provided with a chamber in the forward end thereof, steam channels connected therewith and extending rearwardly therefrom, a steam tube passing through the bottom plate of the reservoir and extending through the forward portion of the reservoir and into the dome portion from the bottom thereof, the lower end of said tube extending into and communicating with the chamber in the base member, and means for detachably securing the tube to the bottom plate and arranged and disposed so that it may be removed from the reservoir through said bottom plate without detaching same.

7. In a pressing iron of the class described, a base member, a leak-proof liquid reservoir positioned above said base member, said reservoir comprising a hollow upper part having an integral top and side walls and being provided with an upwardly extending dome portion and a separate bottom plate, said bottom plate adapted to fit within the lower edges of the walls of the upper part to form with said lower edges a flat surface for engagement with the base member and being permanently secured to said upper part along the entire marginal seam, means for detachably clamping the base member to the reservoir, an electrical heating element positioned between the base member and the bottom plate, means comprising a tube passing through the bottom plate and extending through the reservoir and to a point adjacent the top of said dome portion, conduit means in the base member and in communication with the lower end of the tube, and detachable means for securing the tube to the bottom plate and permitting said tube to be removed through the bottom plate when the base member is detached from the reservoir.

8. In a pressing iron of the class described, a base member, a reservoir positioned above said base member and detachably secured thereto, said reservoir comprising a hollow upper part provided with an upwardly extending dome portion at its forward end, means forming steam channels in the bottom of the base member for distributing steam to the fabric to be pressed, means for placing the upper part of the dome portion in communication with the steam channels, a separate baffle plate within the reservoir extending upwardly at an angle from the forward end of the bottom of the reservoir to a point adjacent the rear of the dome portion, a second separate baffle plate lying in a substantially horizontal plane and positioned at the juncture of the main portion of the reservoir and the dome portion, and means for supporting the second baffle plate by the first named baffle plate.

9. In a pressing iron of the class described, a base member, a leak-proof liquid reservoir positioned above said base member, said reservoir comprising a hollow upper part having integral top and side walls and a separate bottom plate permanently secured to said upper part along the entire marginal seam, means for conducting steam from the upper part of said reservoir to the base member and comprising a tube passing through the bottom plate of the reservoir and extending through the reservoir to a point above the liquid therein, and means accessible from the exterior of the reservoir when the base member is detached therefrom for securing and sealing the tube to the bottom plate and permitting the tube to be removed from the reservoir without detaching the bottom plate from the upper position of said reservoir.

10. In a pressing iron of the class described, a base member for performing the pressing operation, a liquid-containing reservoir associated with the base member, means for applying heat to the base member and for generating steam from the liquid in the reservoir, the bottom surface of the base member being provided with tapered grooves having straight walls diverging downwardly to said surface, and means for conducting steam from the reservoir to one end of each of the grooves, said means comprising steam conducting means joining an end of each groove and so associated with the grooves that said means will guide the steam into the grooves and to said surface in a direction substantially the same as that in which the grooves extend.

11. A pressing iron of the character described, comprising a sole plate having an open groove in its ironing surface, and steam conducting means communicating with the groove and arranged to deliver steam into it and to said surface substantially in the direction in which the groove extends, the said groove being cross-sectionally at least as wide at said surface as at any other portion thereof.

12. A pressing iron of the character described, comprising a sole plate formed of a single thickness of metal and having an open groove in its ironing surface of a depth less than the thickness of the sole plate, and conduit means communicating with the groove and arranged to deliver steam into it substantially in the direction in which it extends, the said groove being cross-sectionally at least as wide at said surface as at any other portion thereof.

13. A pressing iron of the character described, comprising a sole plate having an open groove in its ironing surface, and conduit means communicating with the groove and arranged to deliver steam into an end of the groove substantially in the direction in which the groove extends, said groove being open to the ironing surface from the point of delivery of the steam thereinto to the opposite end thereof and cross-sectionally at least as wide at said surface as at any other portion thereof.

JUDSON T. EDWARDS.
CREWDSON EDWARDS.